(12) United States Patent  (10) Patent No.: US 8,873,353 B1
Riddering  (45) Date of Patent: Oct. 28, 2014

(54) ESTIMATING NARROW, LASER-INDUCED PROTRUSION AT A NEAR-FIELD TRANSDUCER

(71) Applicant: Seagate Technology LLC, Cupertino, CA (US)

(72) Inventor: Jason Riddering, Prior Lake, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/254,179

(22) Filed: Apr. 16, 2014

(51) Int. Cl.
  *G11B 11/00* (2006.01)
  *G11B 13/08* (2006.01)
  *G11B 21/12* (2006.01)
  *G11B 5/48* (2006.01)
  *G11B 5/00* (2006.01)

(52) U.S. Cl.
  CPC ........ *G11B 21/12* (2013.01); *G11B 2005/0021* (2013.01); *G11B 13/08* (2013.01); *G11B 5/4866* (2013.01)
  USPC ....................................... 369/13.33

(58) Field of Classification Search
  None
  See application file for complete search history.

(56) References Cited

U.S. PATENT DOCUMENTS

| 7,486,459 | B1* | 2/2009 | Schreck et al. ............... 360/31 |
| 7,835,104 | B2* | 11/2010 | Yamashita et al. ............ 360/75 |
| 7,995,425 | B2 | 8/2011 | Schreck et al. |
| 8,208,221 | B2* | 6/2012 | Burbank et al. ......... 360/125.74 |
| 8,456,643 | B2 | 6/2013 | Prabhakaran et al. |
| 8,456,980 | B1 | 6/2013 | Thayamballi |
| 8,593,915 | B2 | 11/2013 | Schreck et al. |
| 2001/0013985 | A1* | 8/2001 | Baba et al. ....................... 360/60 |
| 2008/0100950 | A1* | 5/2008 | Mitsunaga et al. ............. 360/75 |
| 2010/0128383 | A1* | 5/2010 | Matsushita et al. ............ 360/75 |
| 2013/0044575 | A1* | 2/2013 | Mori et al. ................... 369/13.26 |
| 2013/0094104 | A1* | 4/2013 | Ngan et al. ....................... 360/31 |
| 2013/0222942 | A1* | 8/2013 | Biskeborn ...................... 360/75 |
| 2013/0293984 | A1* | 11/2013 | Poss et al. ....................... 360/75 |
| 2014/0029397 | A1* | 1/2014 | Rausch et al. ............. 369/13.24 |

* cited by examiner

*Primary Examiner* — Thang Tran
(74) *Attorney, Agent, or Firm* — Hollingsworth Davis, LLC (57) ABSTRACT

Fixed patterns are written on a track of a heat-assisted, recording medium at multiple, heater-induced write clearances via a recording head. The writing involves heating the recording medium via a near-field transducer of the recording head. Amplitudes of the fixed patterns are read back at a predetermined read clearance. A clearance difference between a start and an end of a first data sector of the track is determined based on the amplitudes. A narrow, laser-induced protrusion is estimated at the near-field transducer based on the clearance difference.

20 Claims, 8 Drawing Sheets

ESTIMATING NARROW, LASER-INDUCED PROTRUSION AT A NEAR-FIELD TRANSDUCER

BACKGROUND

Data storage systems may include one or more recording heads that read and write information to a magnetic recording medium. It is often desirable to have a relatively small distance or spacing between a recording head and its associated media. This distance or spacing is referred to herein as "head to media spacing." By reducing the head to media spacing, a recording head may better be able to both write and read data to and from a medium. Reducing the head-to-media spacing also allows for surveying of recording medium topography, such as for detecting asperities and other features of the recording medium surface.

SUMMARY

The present disclosure is directed to estimating narrow, laser-induced protrusion at a near-field transducer. In one embodiment, a method involves writing fixed patterns a track of a heat-assisted, recording medium at multiple, heater-induced write clearances via a recording head. The writing involves heating the recording medium via a near-field transducer of the recording head. Amplitudes of the fixed patterns are read back at a predetermined read clearance. A clearance difference between a start and an end of a first data sector of the track is determined based on the amplitudes. A narrow, laser-induced protrusion is estimated at the near-field transducer based on the clearance difference.

In another embodiment, a method involves determining first and second responses of amplitude versus clearance of a heat-assisted, magnetic recording head based on respective first and second procedures performed respectively before and after a wear period. The first and second procedures include: writing fixed patterns on a track of a recording medium at multiple, heater-induced write clearances (the writing involving heating the recording medium via a near-field transducer of the recording head); and reading back amplitudes of the fixed patterns at a predetermined read clearance. A degradation of the near-field transducer is determined based on comparing the first and second responses.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to detection and control of head-media spacing in data storage devices. The detection of head-to-media spacing becomes more challenging in what are referred to as heat-assisted media recording (HAMR) devices. This technology, also referred to as energy-assisted media recording (EAMR), thermally-assisted media recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to data errors.

Generally, recording heads may utilize heaters for fine control of head-to media spacing. The heaters heat a portion of the recording head that faces the recording medium. The heating causes a local protrusion due to thermal expansion of the material. Thermal protrusion can be finely controlled to maintain a desired clearance between read/write transducers and the recording medium. As will be explained in greater detail below, the introduction of a HAMR energy source to the read/write head can complicate the control of head-to-media spacing. Further, while conventional read/write heads may be allowed to contact the recording medium under some conditions, a HAMR device may be damaged if such contact occurs while recording. This can make the estimation and control of head-to-media spacing more difficult in a HAMR recording head.

Figure 1:
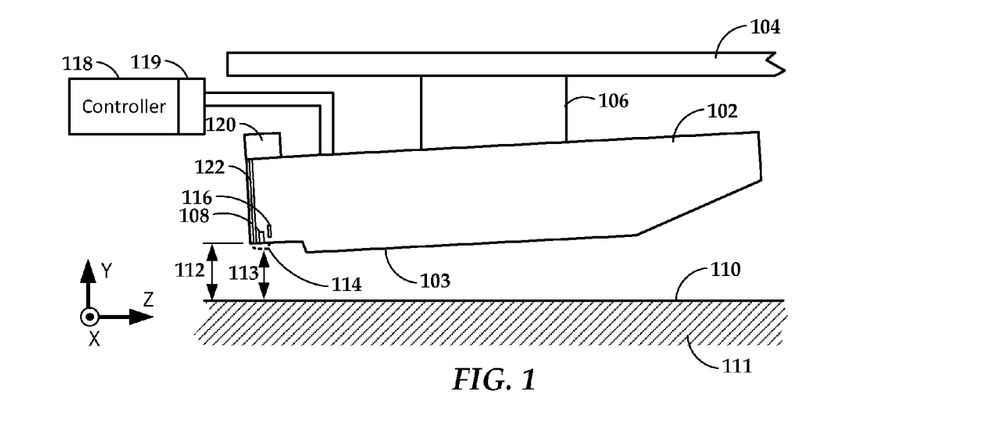
FIG. 1 is a block diagram of a hard drive slider and media arrangement according to an example embodiment.

In reference now to FIG. 1, a block diagram shows a side view of a read/write head 102 according to an example embodiment. The read/write head 102 may be used in a magnetic data storage device, e.g., hard drive. The read/write head 102 may also be referred to herein as a slider, read head, recording head, etc. The read/write head 102 is coupled to an arm 104 by way of a suspension 106 that allows some relative motion between the read/write head 102 and arm 104. The read/write head 102 includes read/write transducers 108 at a trailing edge that are held proximate to a surface 110 of a magnetic recording medium 111, e.g., magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

It is desirable to maintain a predetermined slider flying height 112 over a range of disk rotational speeds during both reading and writing operations to ensure consistent performance. Region 114 is a "close point" of the read/write head 102, which is generally understood to be the closest point of contact between the read/write transducers 108 and the magnetic recording medium 111, and generally defines the head-to-media spacing 113. To account for both static and dynamic variations that may affect slider flying height 112, the read/write head 102 may be configured such that a region 114 of the read/write head 102 can be configurably adjusted during operation in order to finely adjust the head-to-media spacing 113. This is shown in FIG. 1 by dotted line that represents a change in geometry of the region 114. In this example, the geometry change may be induced, in whole or in part, by an increase or decrease in temperature of the region 114.

To provide this type of control over effective head-to-media spacing 113 via heat, the read/write head 102 may include (or otherwise be thermally coupled to) one or more heating elements 116. These heating elements 116 (e.g., resistance heaters) may be provided with selectable amounts of current by a controller 118. Generally, the controller 118 at least includes logic circuitry for controlling the functions of an apparatus that includes at least the read/write head 102 and recording medium 111, and may include other components not shown, such as spindle motor, arm actuator, power supplies, etc. The controller 118 may include or be coupled to interface circuitry 119 such as preamplifiers, buffers, filters, digital-to-analog converters, analog-to-digital converters, etc., that facilitate electrically coupling the logic of the controller 118 to the analog signals used by the read/write head 102 and other components not shown.

Other elements of the read/write head 102 may also provide heat besides or in addition to the heating element 116. For example, a write coil of the read/write transducers 108 may generate sufficient heat to cause configurable deformation of region 114. This deformation will only occur when the coil is energized, e.g., when data is being written. Further, the illustrated read/write head 102 is configured as a HAMR device, which includes additional components that generate heat near the read/write transducer 108. These components include laser 120 (or other energy source) and waveguide 122. The waveguide 122 delivers light from the laser 120 to components near the read/write transducers 108. These components are shown in greater detail in FIG. 2.

Figure 2:
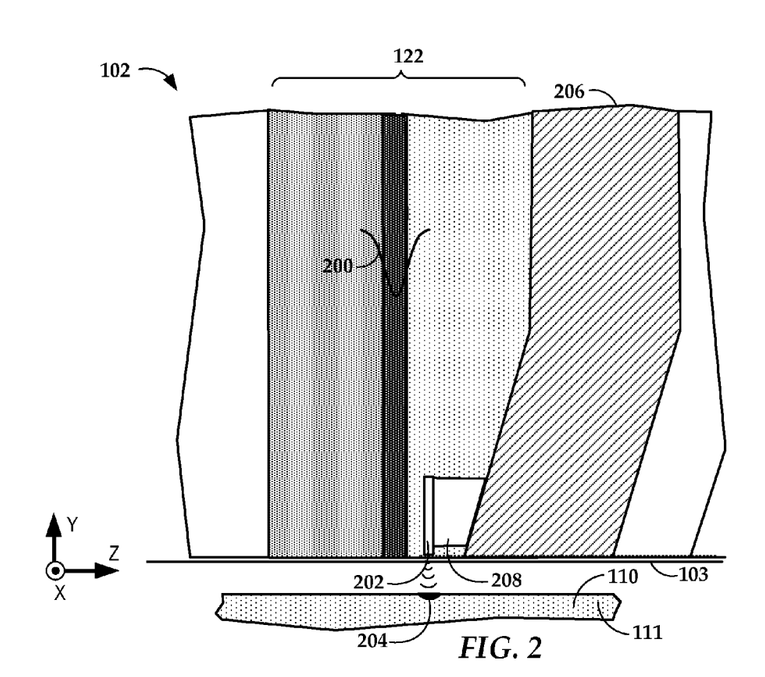
FIG. 2 is a cross-sectional view of a read/write head according to an example embodiment.

In FIG. 2, a block diagram illustrates a cross-sectional view of the read/write head 102 according to an example embodiment. The waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in local region. The near-field transducer 202 may include a heat sink 208 that draws away some heat, e.g., to the write pole 206 or other nearby heat-conductive component. Nonetheless, the temperature increase near the near-field transducer 202 can be quite significant, leading to local protrusion in the region of the write pole 206 and near-field transducer 202. This so-called laser-induced protrusion can be significant for a number of reasons, as shown in the diagram of FIG. 3.

Figure 3:
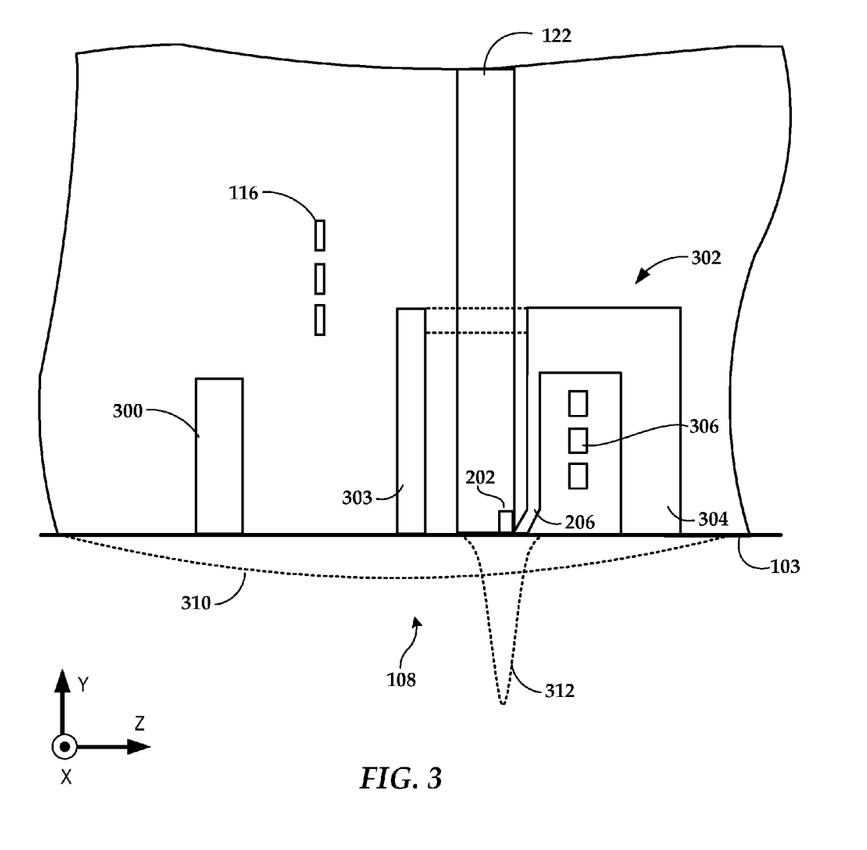
FIG. 3 is a diagram showing protrusion near the read/write transducer at the a media-facing surface according to an example embodiment.

The diagram of FIG. 3 shows protrusion near the read/write transducer 108 at the media-facing surface 103. As seen in this view, the read/write transducer 108 includes a read transducer 300, such a magnetoresistive sensor. The read transducer 300 is located downtrack from the write transducer 302, that includes the aforementioned write pole 206 and near-field transducer 202. The write transducer 302 also includes return poles 303, 304 and a coil 306.

During reads and writes, the heater 116 is activated to control protrusion of the read transducer 300 and write transducer 302, as generally indicated by broad protrusion shape 310. As will be described in detail below, the write pole 206 and other components of the magnetic writer may also contribute to the broad protrusion 310 during write operations. The broad protrusion shape 310 is not necessarily to scale, other than to indicate that it is fairly broad across a region near the read/write transducer 108. In contrast, the optical components such as NFT 202 and waveguide 122 cause a narrower protrusion 312. The narrow protrusion 312 covers a smaller region than the broad protrusion 310, and extends further away from the media-facing surface 103.

Another distinguishing feature of the narrow protrusion 312 is the time constant, e.g., the relative amount of time it takes to maintain a stable shape after application of heat via the energy source. The narrow protrusion 312 can have a time constant on the order of 1-2 μs compared to the broad protrusion 310, which may have a time constant on the order of 100-200 μs. Therefore the narrow protrusion 312 can react significantly faster to input from the energy source compared to the broad protrusion's response to activation of the heater 116.

In non-HAMR storage devices, contact between the read/write head and recording medium may be used in determining clearance. For example, the read/write head may include one or more thermal sensors that can detect temperatures near the media-facing surface. The temperature versus clearance profile from such a sensor has a predictable shape before, during, and after contact with the recording medium. For example, due to conductive heat transfer between the recoding head and the medium, the temperature can take a pronounced dip right as contact occurs. The contact may also or instead be detected by vibrations/modulations induced by the contact that can be detected electrically. The system can detect the contact and use information associated with the detected contact (e.g., heater current used at the point of contact) to verify or update clearance detection settings.

In a HAMR read/write head 102 illustrated in FIGS. 1-3, it may not be possible or desirable to utilize head-to-media contact to determine clearances. For example, the area of the narrow protrusion 312 shown in FIG. 3 may be small enough that thermal, electrical, mechanical modulation resulting from the contact cannot be reliably detected. Also, contact between the NFT 202 (and surrounding areas) with the recording medium may have undesirable effects. The NFT 202 may be formed by a soft metal such as gold, and so may be damaged due to impact with the recording medium. Also, such contact may cause some amount of the metal to abrade on the recording medium, which can contaminate the recording medium and/or the media-facing surface 103 of the read/write head.

Another issue that is complicated by HAMR heating of the read/write head relates to the time it takes various components to achieve thermal equilibrium. When sectors of data are written, the read/write head will transition from a read or idle mode to a write mode. This transition involves, among other things, determining the start of the first sector to be written, and ensuring the read/write head is at a desired clearance when the write pole is energized to begin writing the first sector. However, the write pole will also generate heat as it writes data, and this heat will influence protrusion. Because it takes some time after the write pole is energized for thermal equilibrium to occur, the system may implement additional measures to ensure acceptable clearance of the read/write while writing to the first one or more sectors.

One way of dealing with the need for the write head to come to thermal equilibrium is to use preheating. This involves heating the read/write head via its internal heater to a first level just before the first sector is written. This first level is higher than will be needed to set the desired clearance during most of the write operation. When the writing begins and the write coil is energized, power to the heater is reduced over time to compensate for heat generated by the read/write head. This allows the head-media clearance to remain fairly constant during the first group of data sectors being written such that the write pole is able to write data consistently among all the sectors being written.

In HAMR drives, setting a prewrite clearance can be challenging due to the small contact area and large protrusion that occurs when the laser is engaged. Setting prewrite clearances without knowledge of the magnitude of the NFT-induced protrusion may increase the possibility of head-media contact when writing, which may cause damage to a HAMR recording head during writing. As such, this disclosure describes methods and apparatuses used to characterize HAMR protrusion without the need for contact detection while the laser is activated. This can be used to adjust an operational write clearance based on the estimation of the narrow, laser-induced protrusion. In another embodiment, these methods and apparatuses may be used to measure NFT recession by comparing dynamic amplitude curves before and after head degradation.

Even though NFT-induced protrusion creates a relatively small contact area, the protrusion creates a relatively large spacing change which must be known to correctly set write clearance. This creates a challenging clearance setting scenario. For example, finding the zero point during HAMR writing operations using contact detection (as is done with traditional perpendicular heads) should be avoided. Instead of relying on contact detection during writing, local NFT protrusion can be measured by reading back a single tone pattern that was written at multiple clearance settings. The converged amplitude of the single tone at each clearance is used to generate a fit of clearance versus amplitude that can then be applied to the entire amplitude versus time curve producing a dynamic clearance verses time curve.

Figure 4:
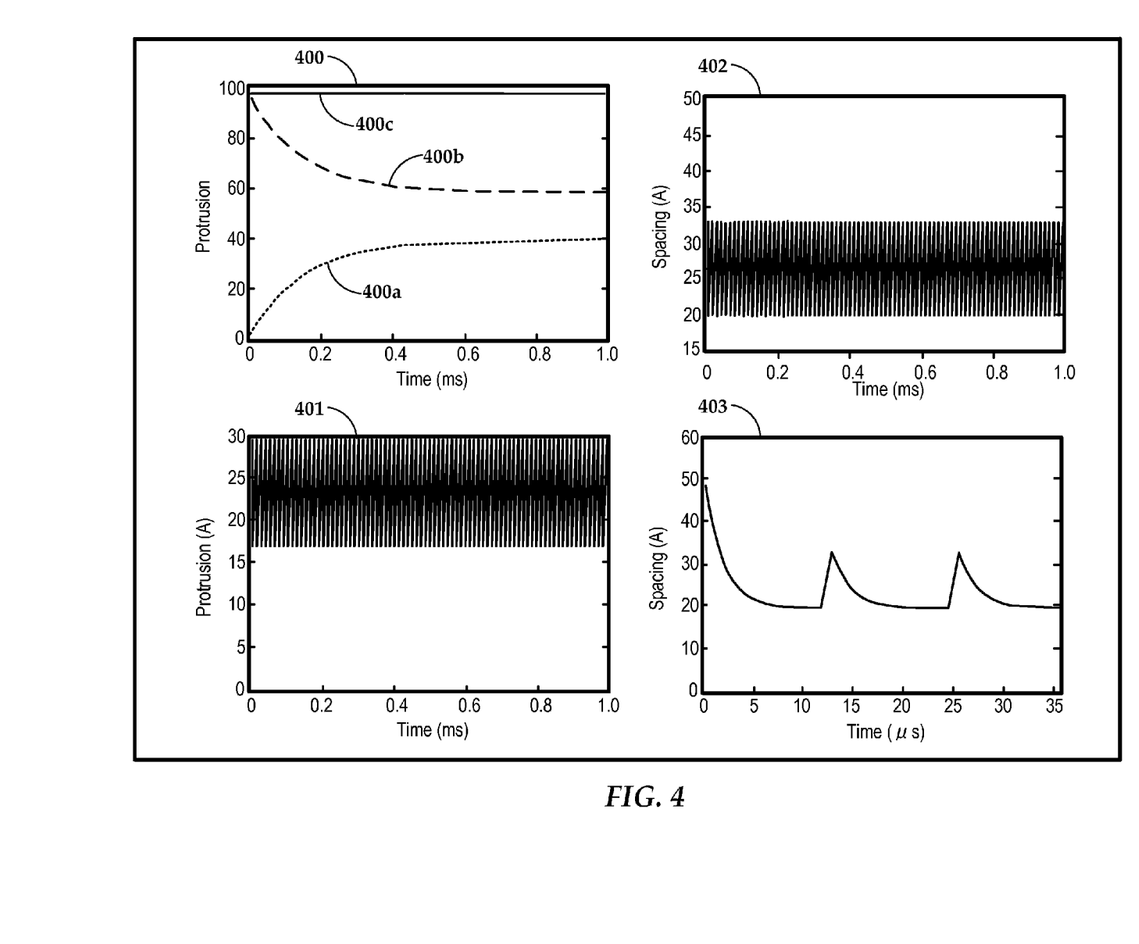
FIG. 4 is a set of graphs illustrating simulation results of a recording head according to an example embodiment.

In FIG. 4, graphs 400-403 illustrate results of a simulation of a HAMR recording head according to an example embodiment. Graph 400 shows digital-to-analog (DAC) inputs to a heater, write coil and laser. Curve 400a is a DAC that represents protrusion due to write coil and broad laser-induced protrusion. As noted above, the laser can introduce a rapidly occurring, narrow protrusion near the NFT. The laser can also induce a secondary protrusion similar in shape and time constant to that of the heater and writer. This secondary may be due to, among other things, diffusion of stray light within the slider, conduction from the NFT region to surrounding areas, etc. The combination of these effects on protrusion can be seen in curve 400a.

Curve 400b represents DAC input to a resistive heater. The preheat region can be seen roughly between 0<t<0.5 ms, where the heater has an increased input that is slowly reduced as the write activity begins to increase its component of protrusion as seen in curve 400a. Curve 400c shows the net result of induced by the combination of curves 400a and 400b. Graph 400 illustrates that, if the total effect power remains constant, the protrusion and therefore close point clearance remains constant as well.

In graph 401, narrow laser-induced protrusion is shown. In this case, the laser is pulsed, e.g., about once every 0.015 ms, resulting in a variation in protrusion of about 13 angstroms (Å). This pulsing is due to the laser being turned off while traversing a servo wedge, then being turned back on to write to a data wedge (also referred to herein as a data sector). Graph 402 shows the narrow laser-induced protrusion of graph 401 combined with the broad protrusion of graph 400 to obtain a time-dependent head-media spacing. Graph 403 shows a close up of the spacing shown in graph 402 for 0<t<0.04 ms. The spacing over the first sector (t<0.015 ms) ranges between 20-50 Å, while for the subsequent sectors the spacing ranges between about 20-33 Å.

As the time constant of the narrow laser-induced protrusion at the NFT is known to be on the order of 1-2 μs, the NFT region should be in thermal equilibrium at the end of the first sector, and other sectors thereafter. The broader protrusion induced by the writer will take much longer (e.g., about 200 times as long) to come to thermal equilibrium, which could cover 30 or more data sectors. Therefore, the broad protrusion can be assumed to have minimal effect on spacing between the beginning and the end of the first sector. As such, differences between the spacing at the start of the first sector and the end of the first sector are an indication of the magnitude of narrow, laser-induced protrusion.

It should be understood that, in an operational drive, the measurement of head-to-media spacing involves measuring other phenomenon that are affected by the spacing. For example, changes in amplitudes of a written pattern for different clearance control inputs (e.g., heater inputs) can be used to determine spacing due to the so-called Wallace spacing loss relationship. The Wallace spacing relationship (also referred to as the Wallace equation) states that change in amplitude of the measured read-back signal directly relates to change of the head-to-media spacing.

While the Wallace equation is used for conventional (e.g., non-HAMR) media, it may still be used in a HAMR device. For example, measurements of head-to-media spacing may be made with the laser turned off to characterize broad protrusion resulting from the heater and writer. Contact detection may also be used with the laser turned off to further improve the estimate of clearances. As will be described below, by performing additional Wallace-equation type testing with the laser turned on, the amplitude versus time response of the first sector can provide an estimate of narrow laser-induced protrusion at the near-field transducer. This can be added to the previously obtained broad protrusion estimates to characterize the total protrusion, and thereby set write clearances to achieve acceptable performance while reducing the risk of NFT-to-media contact.

Figure 5:
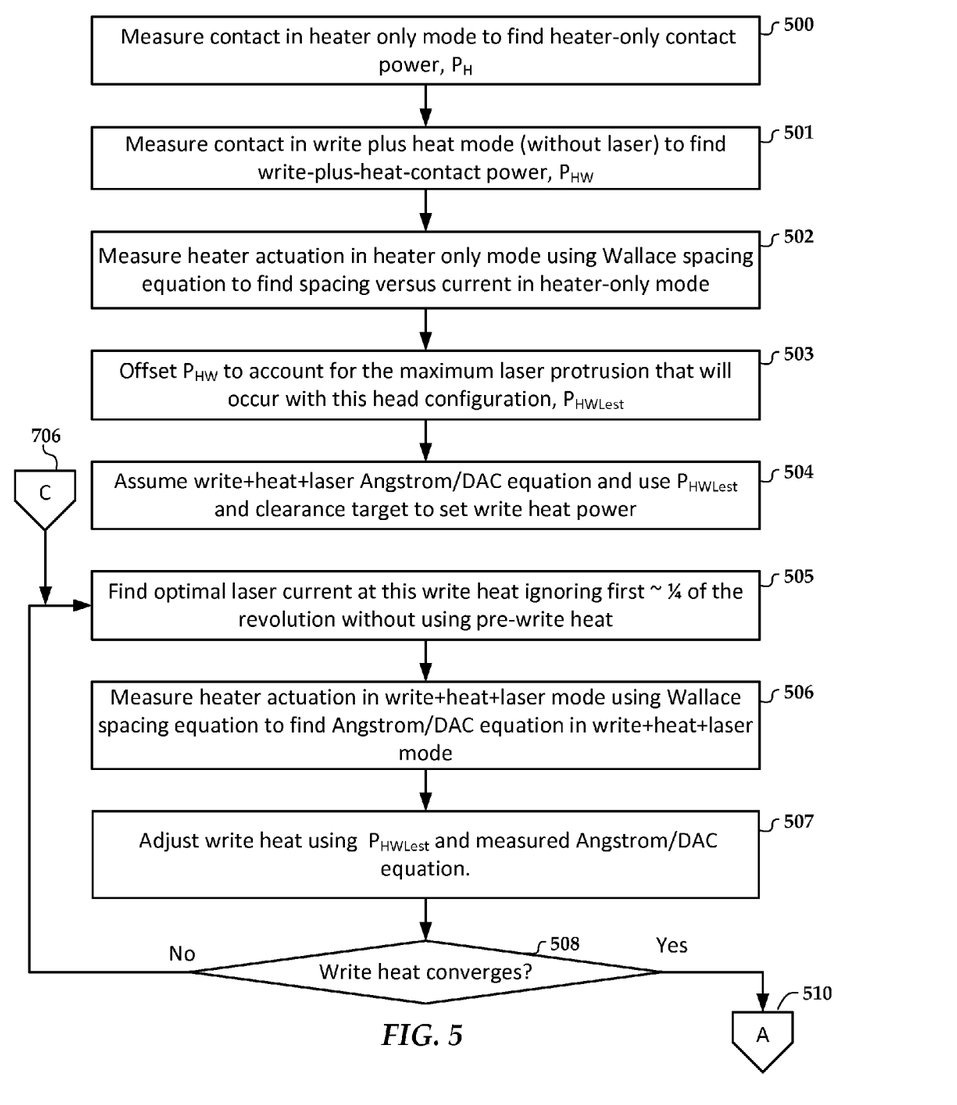
FIGS. 5-7 are flowcharts illustrating a procedure according to an example embodiment.
Figure 6:
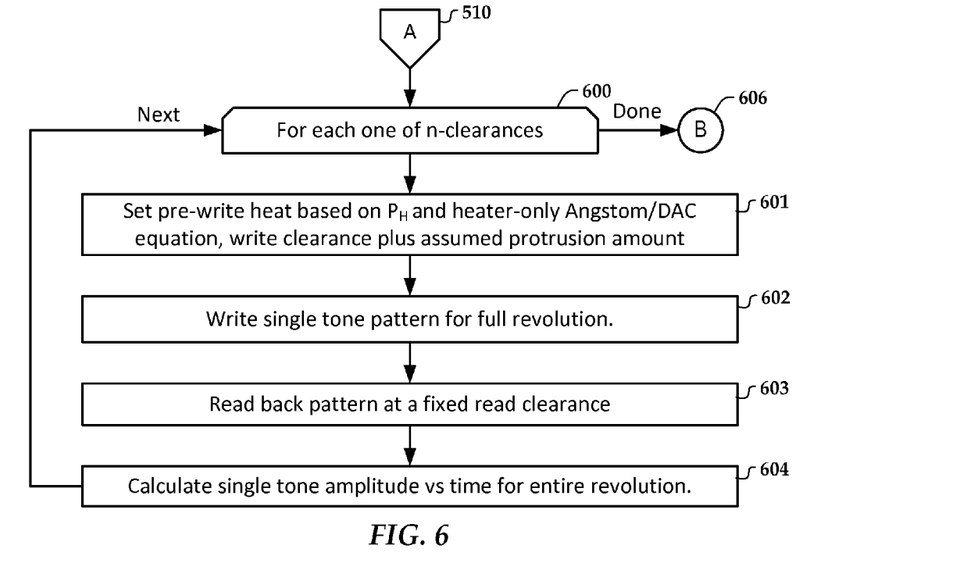
Figure 7:
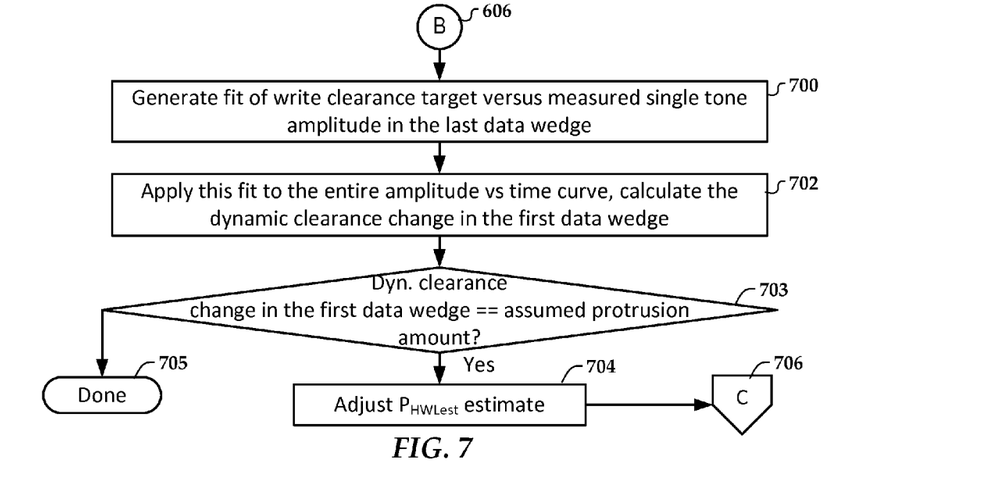

In reference now to FIGS. 5-7, flowcharts show procedures for measuring local NFT protrusion and setting write clearance of a read/write head according to an example embodiment. At block 500 in FIG. 5, contact in heater-only mode is measured. Because the contact occurs without laser-induced protrusion, this minimizes risk of damage due to NFT-to-media contact. This risk of damage due to contact detection may also be minimized by any combination of recession of the NFT, topography features of the media facing surface, and using a limited amount of a laser current The applied power at which contact occurred, which may be stored as a DAC input value, is saved as $P_H$. Similarly, at block 501, contact with write-plus-heat is induced, and the resulting power $P_{HW}$ is saved, e.g., as a DAC input value. At block 502, heater actuation in heater-only mode is measured using the Wallace spacing equation to find spacing versus heater current (e.g., Angstrom/DAC equation) in heater-only mode. This spacing may alternately or in addition be determined using a thermal sensor.

The data gathered at blocks 500-501 are a baseline set of measurements that characterize the broad protrusion of the read/write head. This data may be used for other purposes, e.g., setting read clearances, as well as for setting write clearances. Next, at block 503, a value of maximum laser-only protrusion is estimated, e.g., based on testing and/or analysis of similar read/write heads. The estimation of maximum laser protrusion is used at block 503 to obtain $P_{HWLest}$, which is a conservative estimate of the heater power that will induce head-media contact when the laser is activated. The value of $P_{HWLest}$ is found by adjusting $P_{HW}$ downwards using the spacing equation from block 504 to determine an amount of power to be used to create a desired offset equal to the maximum estimated laser protrusion.

At block 504, the Angstrom/DAC equation is used to set target clearances, again with adjustments based on the $P_{HWLest}$. At block 505, a series of sectors are written, where the results from a first part of the track (e.g., first quarter of a revolution) are ignored. It is possible that this first part of the track will have higher than normal errors due to the read/write head not being in thermal equilibrium, and adjustments for the errors will occur later. At block 506, heater actuation is performed in write+heat+laser mode using the Wallace spacing equation to find Angstrom/DAC equation in write+heat+laser mode. This will provide an updated estimate for $P_{HWLest}$, as shown at block 507 For example, if the previous estimate of $P_{HWLest}$ at block 504 was low (which is likely if it was a conservative estimate) then the clearances measured at 506 will end up being greater at a given heater power than predicted.

Operations of blocks 505-507 are repeated until a convergence is determined at block 508. For example, if clearances set using an adjusted value of $P_{HWLest}$ results in expected performance of the Wallace spacing equation at 506, then the adjusted value is saved as $P_{HWL}$, and the procedure continues as indicated by off-page reference block 510, which continues in FIG. 6. While not shown, there may be a limit set for the number of times the blocks 505-507 execute. For example, if the limit is reached without write heat convergence, an error may be logged and/or the read/write head declared defective.

In FIG. 6, a flow chart continues the procedure from the off-page reference 510 in FIG. 5. The procedure iterates through a number of clearances as indicated by block 600. The current clearance is set at block 601, and is an assumed clearance based on $P_H$ and the heater-only Angstrom/DAC equation that were previously found at blocks 500 and 502 in FIG. 5. The heater-only write clearance is adjusted by the previously determined laser protrusion amount. At block 602, a single-tone pattern is written for a full revolution. The pattern is read back pattern at a fixed read clearance as indicated at block 603. At block 604, a single tone amplitude versus time is calculated for the entire revolution.

After blocks 601-604 have been repeated for a number of clearance values indicated at block 600, control transfers to on-page reference 606, which continues in the flowchart of FIG. 7. At block 700 of FIG. 7, a fit of write clearance target versus measured single tone amplitude is generated in the last data sector/wedge. At block 701, this fit is applied to the entire amplitude verses time curve, resulting in a calculation of the dynamic clearance change in the first data sector/wedge at block 702. Block 703 tests whether the dynamic clearance change in the first data sector/wedge is different than the assumed laser protrusion amount. If the clearance is different, then the $P_{HWLest}$ value is adjusted as shown at block 704. The process then returns to block 505 in FIG. 5 via off-page reference 706, where the previous steps are completed until $P_{HWLest}$ estimates converge. However, if the dynamic clearance change in the first data sector/wedge is the same (or close to) the assumed laser protrusion amount, then the procedure is complete as indicated by block 705.

Figure 8:
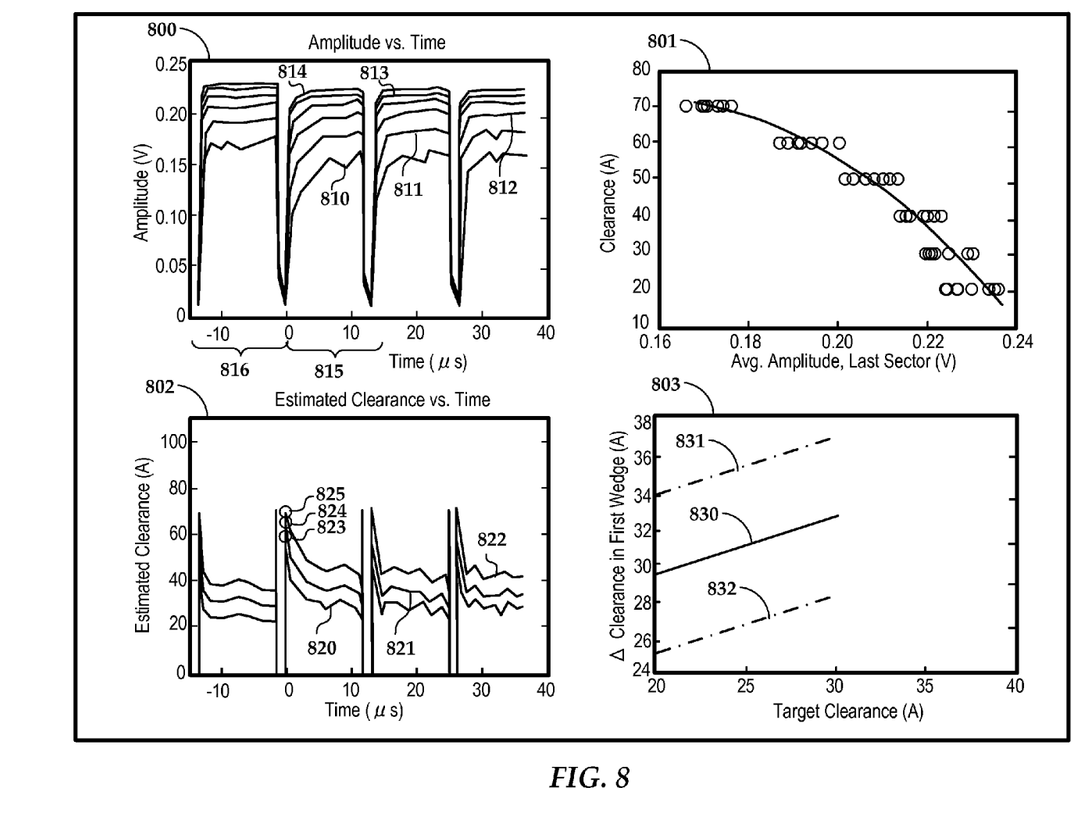
FIGS. 8 and 9 each include a set of graphs illustrating measurements of a recording head according to example embodiments.

In reference now to FIG. 8, graphs 800-803 illustrate test data collected during a characterization procedure performed on a hard drive as described in FIGS. 5-7. In graph 800, curves 810-814 are amplitudes of a pattern recorded at different head-to-media clearances over a track of a disk. Amplitudes at time range 815 represent the first data sector of the track and amplitudes at time range 816 represents the last data sector of the same track. The estimated clearances are 70, 60, 50, 40, 30, and 20 Angstroms for amplitudes 810-814, respectively. The amplitudes in time range 815 illustrate the effects of thermal equilibrium, particularly at high clearances as seen with amplitude curve 810.

Graph 801 illustrates a curve fit of clearances versus amplitude for the last sector. The circles indicate individual measurements, and the curve is a fit such as described at block 700 in FIG. 7. This can be used to estimate dynamic clearance as a function of time, and example of which is shown in graph 802. Curves 820-822 represent clearances estimated for the 40, 30, and 20 Angstrom passes, respectively, corresponding to amplitude curves 812-814 in graph 800. The circles 823-825 near time t=0 represent the estimated starting clearance for each of curves 820-822, respectively.

In graph 803, curve 830 represents the difference between the clearances in at the start of the first sector/wedge (e.g., at points 823-825) relative to the clearance measured at the end of the first sector wedge. Curves 831 and 832 represent one standard deviation from this value. So it can be seen that for a target clearance of 30 Å, the first wedge saw an initial offset of about 32±5 Å. This information can be used in a number of ways. First, this is an estimate of laser induced protrusion, and so it can be used to set clearances, pre-heat values, etc., accordingly. For example, the writer preheat logic can use this estimate to prevent overdriving the head in preheat while writing to a first set of sectors/wedges that correspond to the time constant of the sources of broad protrusion. This information can be used to boost laser power during the first data sector/wedge to account for narrow, laser-induced protrusion during the time period when it is not in thermal equilibrium.

The results shown in FIG. 8 were repeated for a number of different hard drives. The results are shown below in Tables 1 and 2 below. In Table 1, five drives were subjected to the above procedures to determine head-to-media spacing (HMS) for the last data wedge/sector of a track, beginning and end of the first data wedge/sector of the track. This shows that for these drives there is about a 25 Å clearance change in the first wedge. In Table 2, one drive was measured using multiple pre-heat target clearances, confirming the risk of clearance undershoot with too much preheat. For example, the last two rows indicate the HMS at the end of the first wedge (fourth column) is significantly below the target of 20 Å, even though HMS the last wedge was near the target in all cases.

TABLE 1

Measurements of five HAMR drives, pre-write target clearance 50 Å, write head target clearance 20 Å

| Drive | Last wedge HMS, Å | 1$^{st}$ wedge start HMS, Å | 1$^{st}$ wedge end HMS, Å | 1$^{st}$ wedge HMS delta, Å | Std dev., Å |
|---|---|---|---|---|---|
| 1 | 21.4 | 44.2 | 19.2 | 24.9 | 2.5 |
| 2 | 21.6 | 49.1 | 21.1 | 28.0 | 2.3 |
| 3 | 22.6 | 41.6 | 27.7 | 13.9 | 2.8 |
| 4 | 24.0 | 55.4 | 23.1 | 32.3 | 5.1 |
| 5 | 22.7 | 51.7 | 22.8 | 28.9 | 3.3 |
| Average | 22.5 | 48.4 | 22.8 | 25.6 | |

TABLE 2

Measurements of HAMR Drive 1, write head target clearance 20 Å

| Preheat HMS, Å | Last wedge HMS, Å | 1$^{st}$ wedge start HMS, Å | 1$^{st}$ wedge end HMS, Å | 1$^{st}$ wedge HMS delta, Å | Std dev., Å |
|---|---|---|---|---|---|
| 60 | 24.1 | 57.7 | 28.2 | 29.6 | 4.4 |
| 50 | 21.4 | 44.2 | 19.2 | 24.9 | 2.5 |
| 40 | 21.8 | 36.6 | 15.4 | 21.2 | 2.2 |
| 30 | 22.1 | 28.4 | 10.5 | 17.8 | 2.1 |

The measurements described above can be used during an initial calibration of the hard drive device, e.g., post-manufacturing testing and qualification. The measurements can also be used during testing of prototypes, and/or used during the life of a production device to determine problems. For example, one of the failure mechanisms of the NFT is recession from the ABS causing an increased write clearance. The ability to measure this recession could be used to monitor the health of the NFT over time and/or identifying failure mechanisms when degradation has occurred.

Recession of the NFT may be directly measured by comparing dynamic clearance curves before and after degradation. If an amplitude change that occurs post-degradation is due to NFT recession, then shifting the clearance versus amplitude curves would provide a direct measurement of the recession. The amount of measured NFT protrusion before and after degradation can also be used to infer a temperature change at the NFT. In reference now to FIG. 9, a series of graphs 900-903 indicate how a degraded NFT can be detected according to an example embodiment.

For this test, a test read/write head was degraded by continuously running the head over a wear period, (e.g., a period of continuously writing to cause degradation of the head) and measuring triple track bit error rate (BER) with a 1 T erase prior to each measurement. The BER degraded from approximately −2.73 at the beginning of the test to −1.97 at the end of the test. In graph 900 of FIG. 9, curves 911 and 912 represent the respective amplitude of a single tone (4 T) written at respective 20 Å and 60 Å target clearances at the beginning of the test. Curves 913 and 914 (dashed lines) represent the single tone written at respective 20 Å and 60 Å target clearances after the wear period. In graph 901, the last wedge/sector amplitude versus clearance is plotted for before the test (solid circles) and after the test (open circles). These plots are referred to herein as first (or pre-test or pre-wear) response 915 and second (post-test or post-wear) response 916. In graph 902, the estimated clearance over a data wedge/sector is plotted, with curve 920 representing the clearance before the test and curve 921 representing the clearance after the test.

Figure 9:
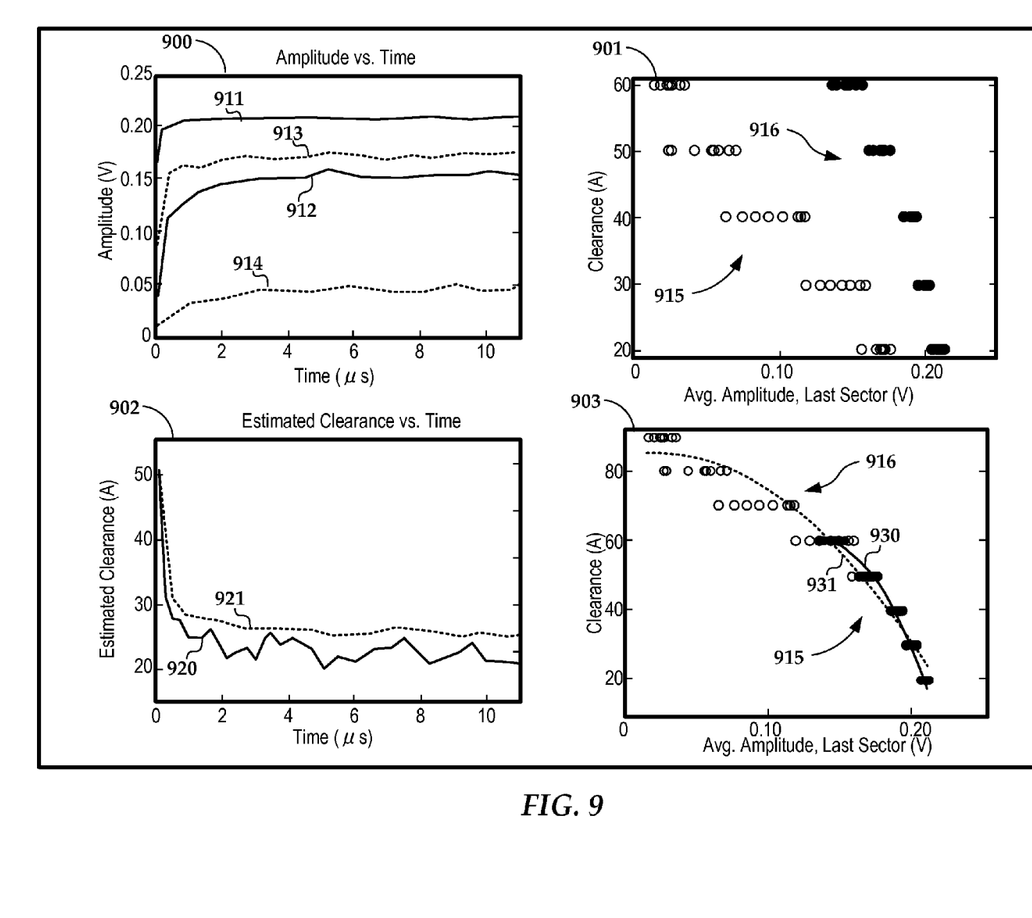

These tests indicate laser-induced protrusion is reduced by about 3 Å, and actual write clearance by about 3-4 Å. However, a 3-4 Å clearance difference would not be expected to produce the differences seen in graph 901. In graph 903, the results of graph 901 are duplicated, but with the post-test response 916 shifted to match (e.g., to line up with) the pre-test response 915. In this case, this is achieved by shifting the post-test response 916 upwards by 30 Å. This indicates approximated 30 Å of NFT recession. This amount of recession could cause the above noted increase in BER. Since the actual write clearance did change due to NFT recession, curve 921 in graph 902 would have to be shifted up by the same 30 A. However, because the delta clearance is similar between curves 920 and 921, the local NFT temperature may be inferred as approximately the same.

Also shown in graph 903 are curves 930 and 931, which represent fits of just the pre-test response 915 and combined responses 915, 916, respectively. The differences between the fit curves 930, 931 may indicate the existence of other types of degradation, such as rounding or distortion of the NFT and/or damage to the surrounding material. The above-described method may be combined with other tests (e.g., cross track profile) to isolate NFT recession versus other NFT failure modes.

The above-describe procedure provides a cost-effective way of testing NFTs during development of HAMR read/write head designs. This testing can also be used to test and validate NFT performance in fielded devices. This type of testing can provide a repeatable and quantifiable measure of NFT degradation. The testing can be performed initially (e.g., on a new device), then performed after the passage of one or more wear periods. A wear period may include any passage time over which degradation of the NFT occurs or is expected to occur. Such degradation may be due to thermal or mechanical causes, and can be used during device development and device deployment.

Figure 10:
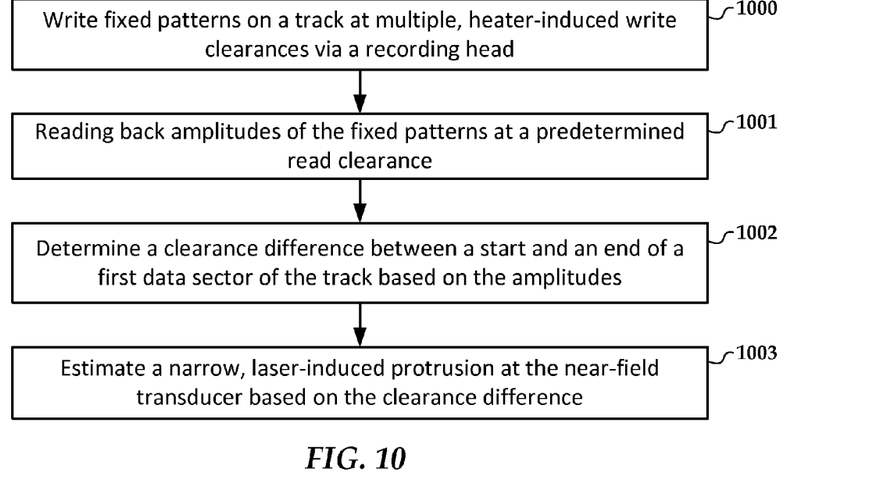
FIGS. 10 and 11 are flowcharts of procedures according to example embodiments.

In reference now to FIG. 10, a flowchart illustrates a method according to an example embodiment. The method involves writing 1000 fixed patterns on a track of a heat-assisted, recording medium at multiple, heater-induced write clearances via a recording head. The writing involves heating the recording medium via a near-field transducer of the recording head. Amplitudes of the fixed patterns are read back 1001 at a predetermined read clearance. Clearance difference between a start and an end of a first data sector of the track are determined 1002 based on the amplitudes. A narrow, laser-induced protrusion at the near-field transducer is determined 1003 based on the clearance difference.

The estimation of the narrow, laser-induced protrusion found in FIG. 10 can be used to adjust an operational write clearance, e.g., to minimize the chance of contact between the near-field transducer and the recording medium during write operations. The estimation of narrow, laser-induced protrusion can also be used to boost laser power during writing of first user data sectors to compensate for the narrow, laser-induced protrusion not being in full thermal equilibrium.

Figure 11:
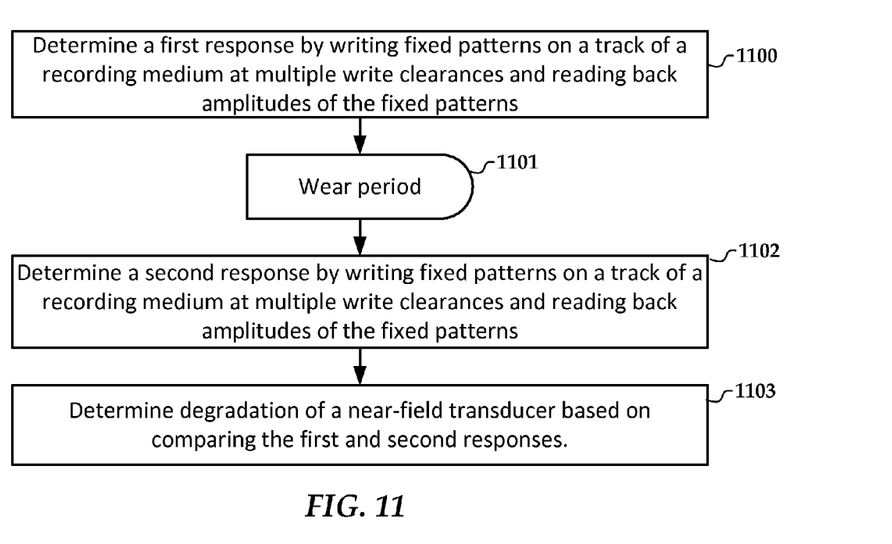

In FIG. 11, a flowchart shows another method according to an example embodiment. First and second responses of amplitude versus clearance of a heat-assisted magnetic recording head are determined at blocks 1100 and 1102 respectively before and after a wear period 1101. The procedures performed in blocks 1100 and 1102 both involve writing fixed patterns on a track of a recording medium at multiple, heater-induced write clearances, the writing involving heating the recording medium via a near-field transducer of the recording head. The procedures also involve reading back amplitudes of the fixed patterns at a predetermined read clearance. Degradation of the near-field transducer is determined 1103 based on comparing the first and second responses.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. For example, controller 118 may be configured to perform the methods and procedures described above.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   writing fixed patterns on a track of a heat-assisted, recording medium at multiple, heater-induced write clearances via a recording head, the writing involving heating the recording medium via a near-field transducer of the recording head;
   reading back amplitudes of the fixed patterns at a predetermined read clearance;
   determining a clearance difference between a start and an end of a first data sector of the track based on the amplitudes; and
   estimating a narrow, laser-induced protrusion at the near-field transducer based on the clearance difference.

2. The method of claim 1, further comprising adjusting an operational write clearance based on the narrow, laser-induced protrusion.

3. The method of claim 2, further wherein the adjusting of the operational write clearance minimizes contact between the near-field transducer and the recording medium during write operations.

4. The method of claim 1, further comprising:
   detecting a contact between the recording head and the recording medium;
   determining a broad protrusion of the recording head based on detecting the contact; and
   using the broad protrusion to estimate clearances when writing the fixed patterns on the track.

5. The method of claim 4, wherein the near-field transducer is protected during the contact by one or more of recession of the near-field transducer, topography features of a media-facing surface of the recording head, and limiting a current to a laser of the recording head.

6. The method of claim 1, further:
   comprising determining a broad protrusion of the recording head by measuring a protrusion difference via a Wallace spacing equation; and
   using the broad protrusion to estimate clearances when writing the fixed patterns on the track.

7. The method of claim 1, further comprising, based on the clearance difference, boosting laser power during writing of first user data sectors to compensate for the narrow, laser-induced protrusion not being in full thermal equilibrium.

8. The method of claim 1, further comprising determining a fit of the amplitudes versus the estimated write clearances for a last data sector of the track, and wherein determining the clearance difference comprises applying the fit to the amplitudes measured at the first data sector.

9. The method of claim 8, further comprising after a wear period:
   writing the fixed patterns on the track at the multiple, heater-induced write clearances;
   reading back second amplitudes of the fixed patterns at the predetermined read clearance;
   determining a second fit of the second amplitudes versus the estimated write clearances for the last data sector; and
   determining degradation of the near-field transducer based on comparing data points of the fit versus second data points of the second fit.

10. The method of claim 9, wherein determining degradation further comprises determining recession of the near-field transducer.

11. The method of claim 1, wherein a thermal time constant of the narrow, laser-induced protrusion is less than a time to traverse the first data sector of the track.

12. An apparatus, comprising:
    interface circuitry capable of coupling to a recording head; and
    a controller coupled to the interface circuitry, the controller configured to:
       write fixed patterns on a track of a heat-assisted, recording medium at multiple, heater-induced write clearances via the recording head, the writing involving heating the recording medium via a near-field transducer of the recording head;
       read back amplitudes of the fixed patterns at a predetermined read clearance;
       determine a clearance difference between a start and an end of a first data sector of the track based on the amplitudes; and
       estimate a narrow, laser-induced protrusion at the near-field transducer based on the clearance difference.

13. The apparatus of claim 12, wherein the controller is further configured to adjust an operational write clearance based on the narrow, laser-induced protrusion.

14. The apparatus of claim 12, wherein the controller is further configured to, based on the clearance difference, boosts laser power during writing of first user data sectors to compensate for the narrow, laser-induced protrusion not being in full thermal equilibrium.

15. The apparatus of claim 12, further comprising determining a fit of the amplitudes versus the estimated write clearances for a last data sector of the track, and wherein determining the clearance difference comprises applying the fit to the amplitudes measured at the first data sector.

16. The apparatus of claim 12, wherein a thermal time constant of the narrow, laser-induced protrusion is less than a time to traverse the first data sector of the track.

17. The apparatus of claim 12, wherein the controller is further configured to:
    determining a broad protrusion of the recording head based on at least one of contact detection between the recording head and the recording medium and measuring a protrusion difference via a Wallace spacing equation; and
    using the broad protrusion to estimate clearances when writing the fixed patterns on the track.

18. A method comprising:
    determining first and second responses of amplitude versus clearance of a heat-assisted, magnetic recording head based on respective first and second procedures performed respectively before and after a wear period, wherein the first and second procedures comprise:

writing fixed patterns on a track of a recording medium at multiple, heater-induced write clearances, the writing involving heating the recording medium via a near-field transducer of the recording head; and reading back amplitudes of the fixed patterns at a predetermined read clearance; and determining a degradation of the near-field transducer based on comparing the first and second responses.

19. The method of claim 18, wherein determining the degradation of the near-field transducer comprises shifting the second response to match the first response, a distance associated with the shifting comprises an estimate of recession of the near-field transducer.

20. The method of claim 19, wherein the degradation comprises one or more of a recession and a distortion of the near-field transducer, and wherein a comparison between curve fits of the first response and shifted second response are used to isolate the recession of the near-field transducer from the distortion of the near-field transducer.

* * * * *